(No Model.)
J. C. ECKERT.
COMBINED GAGE AND CENTER SQUARE.
No. 329,892. Patented Nov. 10, 1885.
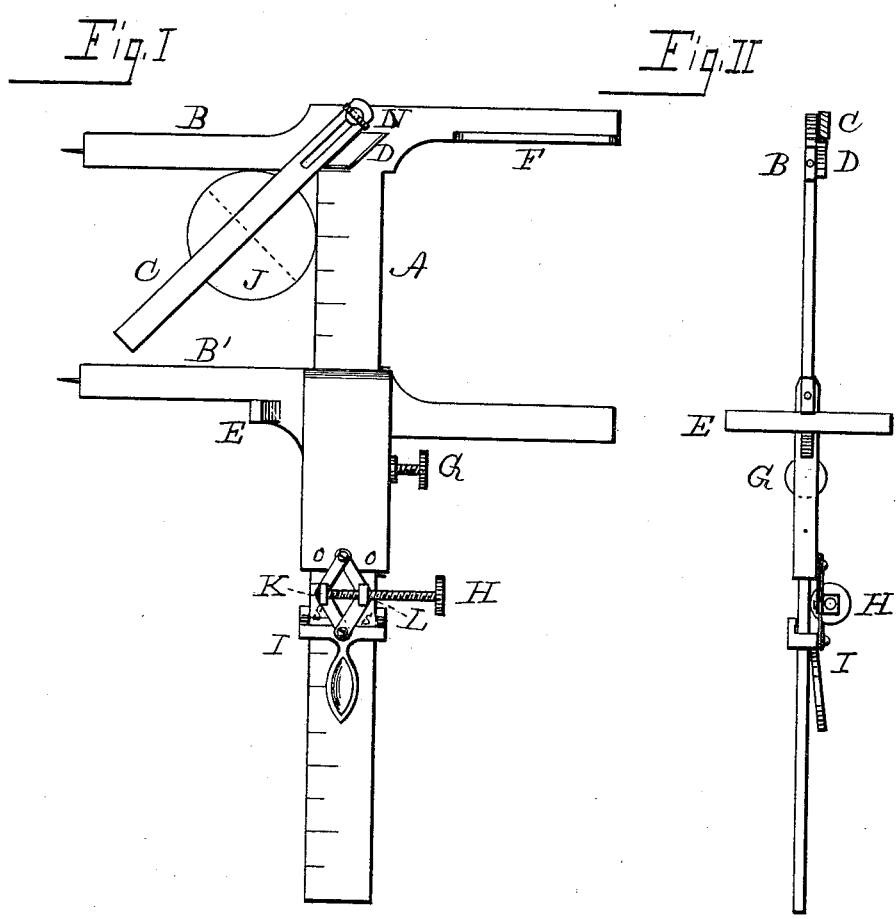
WITNESSES
Leopold Leibold
Lovis S. Reibold.
INVENTOR
John C. Eckert
By B. Pickering, Attorney

UNITED STATES PATENT OFFICE.

JOHN C. ECKERT, OF DAYTON, OHIO.

COMBINED GAGE AND CENTER SQUARE.

SPECIFICATION forming part of Letters Patent No. 329,892, dated November 10, 1885.

Application filed July 23, 1885. Serial No. 172,365. (No model.)

*To all whom it may concern:*

Be it known that I, JOHN C. ECKERT, a citizen of the United States, residing at Dayton, in the county of Montgomery and State of Ohio, have invented a certain new and useful Improvement in Combined Metal Gages and Center Squares; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in a combined metal gage and center square; and it consists of two symmetrical heads, forming an outside and inside caliper, with clamp adjustment for the movable head which embraces the beam, and a pivotal bar is attached to the fixed head by a thumb-screw, to serve as a center square and as a bevel. On the said beam are divisions of inches and fractions thereof.

The mechanism is illustrated in the accompanying drawings, in which Figure I is a side view of the metal gage. Fig. II is a view of the same at a right angle to former views.

Like letters designate like parts throughout both views.

A is the beam, which is divided into inches and numbered, and preferably subdivided into hundredths of inches. B is a fixed head attached to the end of the beam, and B' is a movable head, like the former in general contour, with the exception of the sleeve, which embraces the beam and the shoulder E. The extensions of these heads to the left form an inside caliper and those to the right an outside caliper. The measurement of the outside of the former corresponds exactly to the inside of the latter. To the left extensions are attached points which serve as dividers. A gib is placed in the sleeve of the movable head, against which the set-screw G bears to hold said head against the left edge of the beam. Embracing the beam, and connected to the sleeve of the movable head, is the finger-clamp I.

The plates *s s* are attached by a screw to the center of the clamp, and the plates *o o* are attached in like manner to the sleeve, and the ends of all are joined by pivots on the swivel K and the nut L.

The end of the screw H is attached to the swivel, and the thread of the same engages the nut. By this device the head is carried to and fro along the beam by simply turning the screw for nice adjustment, and when the adjustment is effected the binding-screw is used to hold the head rigidly in place.

The slotted bar C is held to the head B by the thumb-screw N. When not in use, the same as held against the ledge F, and when used to find the center of a round bar of iron it is fastened against the lug D, which secures the inner face of the bar at an angle of forty-five degrees in relation to both the head and the beam.

The circular line J shows the position of the bar of iron, in which position a line is marked across the face, the same is turned partially around, and another line is made corresponding to dotted line, and at the intersection of these lines is the true center. This bar may be turned on its pivot and set at any desirable angle to the outer surface of the head, and thus serve as a bevel-gage.

In the drawings, Fig. II, the bar C is shown in section as lying against the ledge.

In calipering the orifice of a pulley the caliper is placed in with the shoulder E in contact with the face of the pulley, and the adjustment of the caliper is more readily effected than if such shoulder were not used, as said shoulder is at a right angle to the right line of the caliper, thereby holding the same to the true center of the pulley.

In adjusting the movable head by the finger-clamp the left thumb is pressed upon the arm, thus binding the clamp, and fingers of the right hand are used to operate the screw.

Having fully described my invention, what I claim, and desire to secure by Letters Patent, is—

1. In a combined inside and outside caliper, an adjustable device composed of finger-clamp embracing the beam, connecting-plates joining said clamp and movable head, and swivel and nut jointed therewith, and screw to operate the same, substantially as and for the purpose set forth.

2. The bar A, with the heads B and B' mounted thereon, adapting the same to be used as an inside and outside caliper, and the lug D and ledge F on the head B, in combination with the slotted blade C and the thumb-nut N, whereby the said blade may be clamped either against the lug D or the ledge F, substantially as set forth.

In testimony that I claim the foregoing as my own I affix my signature in presence of two witnesses.

JOHN C. ECKERT.

Witnesses:
B. PICKERING,
SUMNER T. SMITH.